United States Patent
Kaewell, Jr. et al.

(10) Patent No.: US 7,082,286 B2
(45) Date of Patent: Jul. 25, 2006

(54) PATH SEARCHER USING RECONFIGURABLE CORRELATOR SETS

(75) Inventors: John David Kaewell, Jr., Jamison, PA (US); Timothy Berghuis, Exton, PA (US); Jan Meyer, Weilheim (DE); Peter Bohnhoff, Munich (DE); Alexander Reznik, Princeton, NJ (US); Edward L. Hepler, Malvern, PA (US); Michael Koch, Fort Salonga, NY (US); William C. Hackett, Doylestown, PA (US); David S. Bass, Great Neck, NY (US); Steven Ferrante, Warrington, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 447 days.

(21) Appl. No.: 10/412,475

(22) Filed: Apr. 11, 2003

(65) Prior Publication Data
US 2004/0047439 A1    Mar. 11, 2004

Related U.S. Application Data

(60) Provisional application No. 60/372,531, filed on Apr. 12, 2002.

(51) Int. Cl.
    *H04B 15/00*    (2006.01)
(52) U.S. Cl. .................. 455/65; 455/506; 455/561; 455/562.1; 455/273; 375/142; 375/150; 375/147; 375/152; 370/335; 370/342
(58) Field of Classification Search ............ 375/134, 375/142, 150, 144, 149, 147; 370/342, 320, 370/335; 455/65, 273
    See application file for complete search history.

(56) References Cited

U.S. PATENT DOCUMENTS

| 5,237,586 A | 8/1993 | Bottomley |
| 5,329,548 A | 7/1994 | Borg |

(Continued)

FOREIGN PATENT DOCUMENTS

CN    1140365    1/1997

(Continued)

OTHER PUBLICATIONS

Kong et al., "Average SNR of a Generalized Diversity Selection Combining Scheme," IEEE Communications Letters, vol. 3, No. 3, Mar. 1999, pp. 57-59.

*Primary Examiner*—Marceau Milord
(74) *Attorney, Agent, or Firm*—Volpe and Koenig, P.C.

(57) ABSTRACT

A Node-B/base station has a path searcher and at least one antenna for receiving signals from users. The path searcher comprises a set of correlators. Each correlator correlates an inputted user code with an inputted antenna output of the at least one antenna. An antenna controller selectively couples any output of the at least one antenna to an input of each correlator of the set of correlators. A code phase controller selects a user code for input into the set of correlators. Each delay of a series of delays delays the selected user code by a predetermined amount and each correlator of the set of correlators receives a different code phase delay of the selected user code. A sorter and path selector sorts the output energy levels of each correlator of the sets of correlators and produces a path profile for a user based on the sorted output energy levels.

14 Claims, 4 Drawing Sheets

U.S. PATENT DOCUMENTS

| | | | |
|---|---|---|---|
| 5,471,509 A | 11/1995 | Wood et al. | |
| 5,490,165 A | 2/1996 | Blakeney, II et al. | |
| 5,894,473 A * | 4/1999 | Dent | 370/342 |
| 5,910,948 A | 6/1999 | Shou et al. | |
| 5,940,438 A | 8/1999 | Poon et al. | |
| 6,141,334 A | 10/2000 | Flanagan et al. | |
| 6,163,533 A | 12/2000 | Esmailzadeh et al. | |
| 6,324,210 B1 * | 11/2001 | Yang et al. | 375/152 |
| 6,333,926 B1 | 12/2001 | Van Heeswyk et al. | |
| 6,333,934 B1 * | 12/2001 | Miura | 370/441 |
| 6,414,984 B1 * | 7/2002 | St.ang.hle | 375/142 |
| 6,463,048 B1 * | 10/2002 | Garyantes | 370/342 |
| 6,487,193 B1 * | 11/2002 | Hamada et al. | 370/342 |
| 6,580,749 B1 * | 6/2003 | Miura | 375/147 |
| 6,618,434 B1 | 9/2003 | Heidari-Bateni et al. | |
| 6,636,557 B1 * | 10/2003 | Imaizumi et al. | 375/147 |
| 6,697,417 B1 * | 2/2004 | Fernandez-Corbaton et al. | 375/147 |
| 6,714,586 B1 * | 3/2004 | Yang et al. | 375/148 |
| 6,728,304 B1 * | 4/2004 | Brown et al. | 375/148 |
| 6,748,013 B1 * | 6/2004 | Reznik et al. | 375/148 |
| 6,785,322 B1 | 8/2004 | Kaewell et al. | |
| 6,834,075 B1 * | 12/2004 | Wang | 375/143 |
| 2001/0033614 A1 | 10/2001 | Hudson | |
| 2001/0038666 A1 | 11/2001 | Mesecher et al. | |
| 2002/0010002 A1 | 1/2002 | Heinla | |
| 2002/0036998 A1 | 3/2002 | Lomp | |

FOREIGN PATENT DOCUMENTS

| | | |
|---|---|---|
| CN | 1182986 | 5/1998 |
| CN | 1253424 | 5/2000 |
| CN | 1356802 | 7/2002 |
| CN | 1366390 | 8/2002 |
| CN | 1379932 | 11/2002 |
| CN | 1390001 | 1/2003 |
| EP | 1 028 540 | 8/2000 |
| EP | 1 220 482 | 7/2002 |
| JP | 12308148 | 11/2000 |
| JP | 200116628 | 1/2001 |
| WO | 95/22210 | 8/1995 |
| WO | 01/03318 | 1/2001 |
| WO | 0103318 | 1/2001 |
| WO | 01/13530 | 2/2001 |
| WO | 0113530 | 2/2001 |
| WO | 01/22638 | 3/2001 |

* cited by examiner

PATH SEARCHER USING RECONFIGURABLE CORRELATOR SETS

CROSS REFERENCE TO RELATED APPLICATION(S)

This application claims priority from U.S. Provisional Application No. 60/372,531, filed on Apr. 12, 2002, which is incorporated by reference as if fully set forth.

FIELD OF INVENTION

This invention generally relates to wireless code division multiple access communication systems. In particular, the invention relates to path searching in such systems.

BACKGROUND

In wireless communication system, a signal transmitted from an antenna typically follows multiple paths to its destination. In many communication systems, these paths are combined at the receiver to produce a received signal with a better signal quality than any one of the paths alone could provide. One approach to combine these multiple paths is a Rake receiver which combines a specified number of the stronger paths together. The Rake receiver recovers the received signal over each of the strong paths, weights each recovered path signal by a magnitude and phase and combines the resulting weighted signals together.

To determine the paths to combine and the corresponding weights to use for those paths, a path searcher is typically used. The path searcher typically searches code phases for multipath components of a transmitted signal. The code phases having the strongest received components are selected for the Rake receiver. Based on the received energy of these components, the path searcher determines the magnitude each component should be given by the Rake.

FIGS. 1A and 1B are simplified illustrations of cells 24A and 24B that a path searcher may be utilized. These figures have been extremely simplified for illustrative purposes. In FIG. 1A, cell 24A is unsectorized. The base station 20 uses one antenna element to receive signals from each user, UEs $22_1$ to $22_3$. A path searcher in cell 24A analyzes each user over its delay spread plus some margin for uncertainty, such as 100 chips. As a result, only a spread of 300 chips is analyzed by the path searcher of cell 24A.

By contrast, in FIG. 1B, the cell 24B has six sectors $27_1$ to $27_6$. The base station 20 of the cell 24A uses two antenna elements $26_{11}$ to $26_{62}$ per sector $27_1$ to $27_6$. For UE $22_2$, the paths of its transmissions are analyzed by each antenna element $26_{61}$, $26_{62}$ of its sector $27_6$ over the delay spread of that UE's transmissions, such as 100 chips. As a result, effectively a combined spread of 200 chips (100 chips per antenna) is analyzed for UE $22_2$. UE $22_1$ is moving between sectors $27_1$ and $27_2$ and is experiencing softer handover. In softer handover, the base station 20 receives the UE's transmissions over both sector's antenna elements $26_{11}$, $26_{12}$, $26_{61}$, $26_{62}$. For a UE experiencing softer handover in cell 24B, effectively a combined spread of 400 chips (100 chips per two antenna elements per two sectors) is analyzed. To analyze the paths of all the UEs $22_1$ to $22_7$ of cell 24B, a combined delay spread of 1600 chips (6 users in one sector, 200 chips, and one user experiencing softer handover, 400 chips) is analyzed by the path searcher.

As illustrated by FIGS. 1A and 1B, a path searcher for the Node-B/base station of cell 24A needs to analyze far less paths than a path searcher for cell 24B. One approach to design a path searcher to handle both cells is to design the path searcher for the worst case loading, such as cell 24B. One drawback to such a path searcher is that much of its resources are not utilized when used in a lightly loaded cell, such as cell 24A. As a result, the operator of cell 24A may invest in an inefficient path searcher more costly than necessary.

Another approach is to design a path searcher customized to each cell. One path searcher design handles lightly loaded cells, such as cell 24A. Another path searcher design handles heavily loaded cells, such as cell 24B. Although such an approach minimizes the amount of idle resources in lightly loaded cells, it requires two or multiple differing designs, which is undesirable. Additionally, cell loadings may change over time. The loading of cell 24A may increase in loading to the level of cell 24B. In such a situation, the lightly loaded path searcher would be replaced by a heavily load cell path searcher. Such a retrofit is costly and undesirable.

Accordingly, it is desirable to have a Node-B/base station path searcher adaptable to varying cell conditions.

SUMMARY

A Node-B/base station has a path searcher and at least one antenna for receiving signals from users. The path searcher comprises a set of correlators. Each correlator correlates an inputted user code with an inputted antenna output of the at least one antenna. An antenna controller selectively couples any output of the at least one antenna to an input of each correlator of the set of correlators. A code phase controller selects a user code for input into the set of correlators. Each delay of a series of delays delays the selected user code by a predetermined amount and each correlator of the set of correlators receives a different code phase delay of the selected user code. A sorter and path selector sorts the output energy levels of each correlator of the sets of correlators and produces a path profile for a user based on the sorted output energy levels.

BRIEF DESCRIPTION OF THE DRAWING(S)

DETAILED DESCRIPTION OF THE PREFERRED EMBODIMENT(S)

Figure 1A:
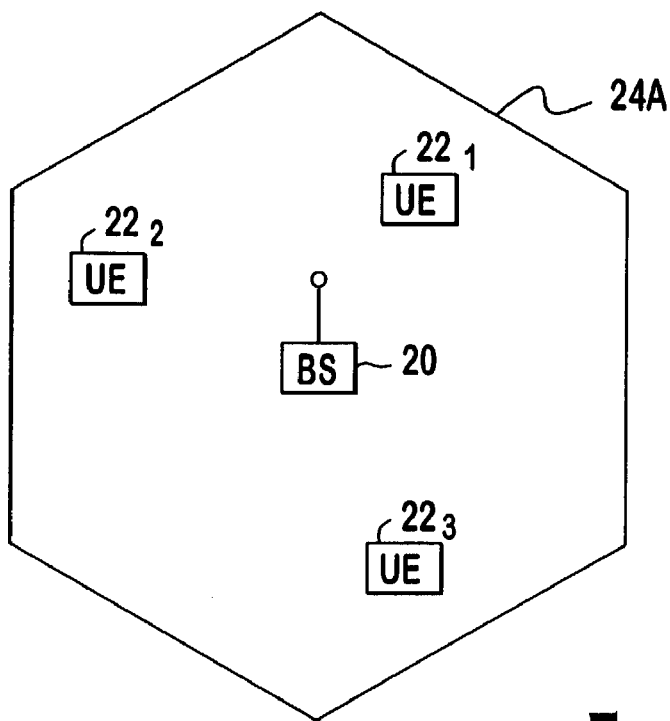
FIG. 1A is an illustration of a cell having a base station using one omni-directional antenna.
Figure 1B:
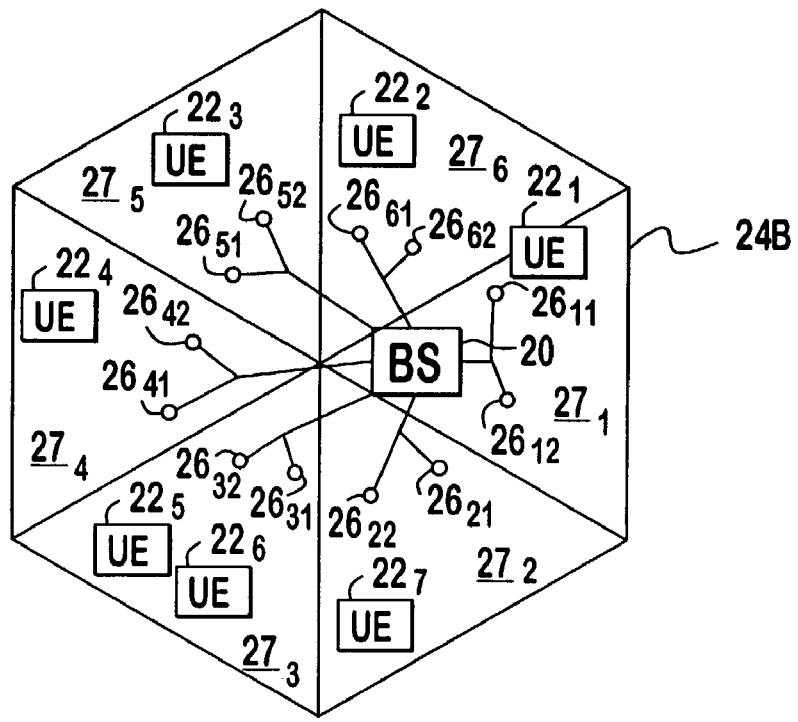
FIG. 1B is an illustration of a cell with six sectors having a base station using two antenna elements per sector.
Figure 2:
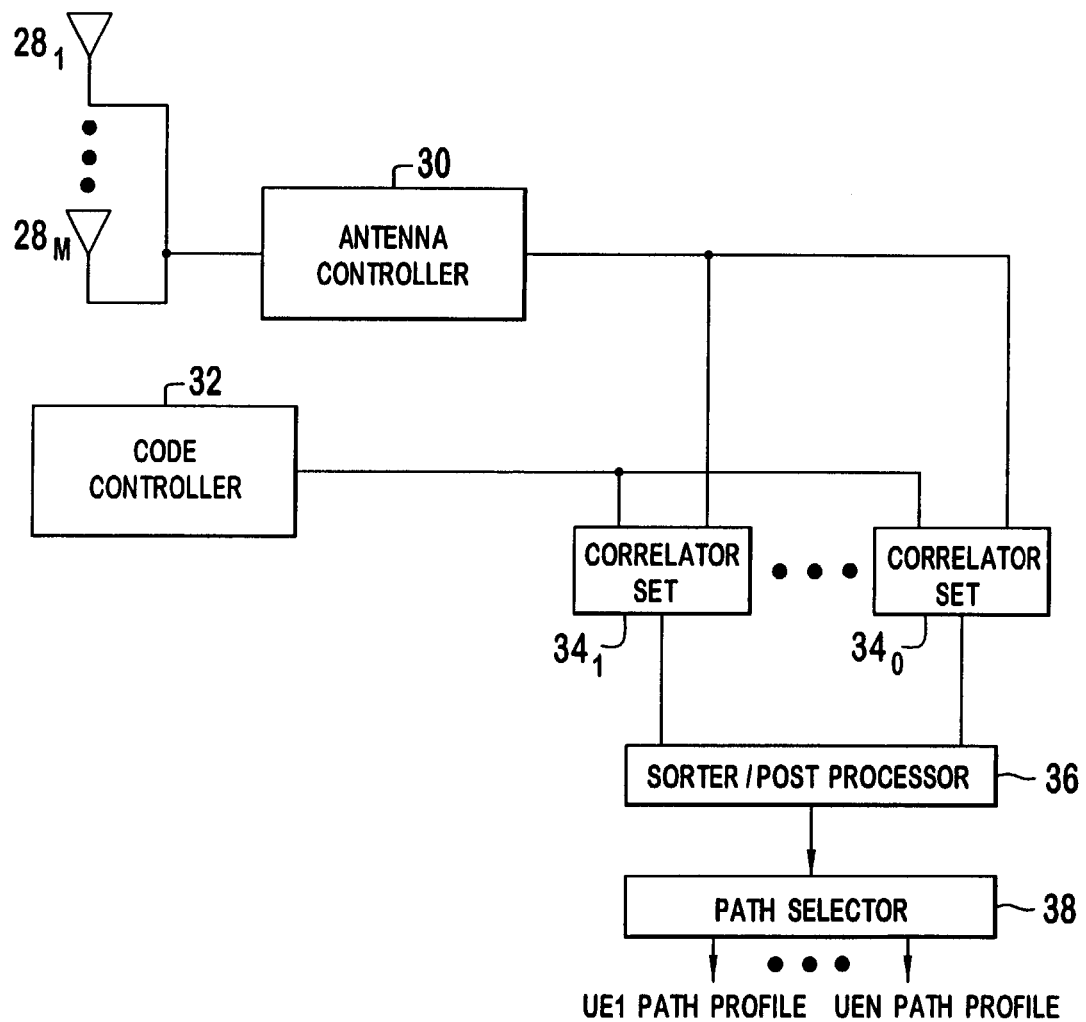
FIG. 2 is a simplified diagram of a path searcher.

FIG. 2 is a simplified block diagram of a preferred base station/Node-B path searcher. Each antenna $28_1$ to $28_M$ of the base station/Node-B is coupled to an antenna controller 30. The number of antennas, M, varies. For a base station/Node-B using one omni directional antenna, the number of antennas is one (M=1). For sectored cells using an antenna array for each sector, the number of antenna elements may be large. To illustrate referring to FIG. 1B, a six sector cell with two antenna elements per sector would have a total of twelve (12) antenna elements (M=12). The antenna controller 30 effectively controls the coupling of the antenna outputs to a set of correlators $34_1$ to $34_O$ (34).

Each UE 22 that the path searcher is tracking has a code assigned to it. In the proposed third generation partnership project (3 GPP) wideband code division multiple access communication system (W-CDMA) communication system, each UE's code would be a combination of a spreading code and a scrambling code. A code controller 32 controls the UE code input into each correlator set 34.

Figure 3:
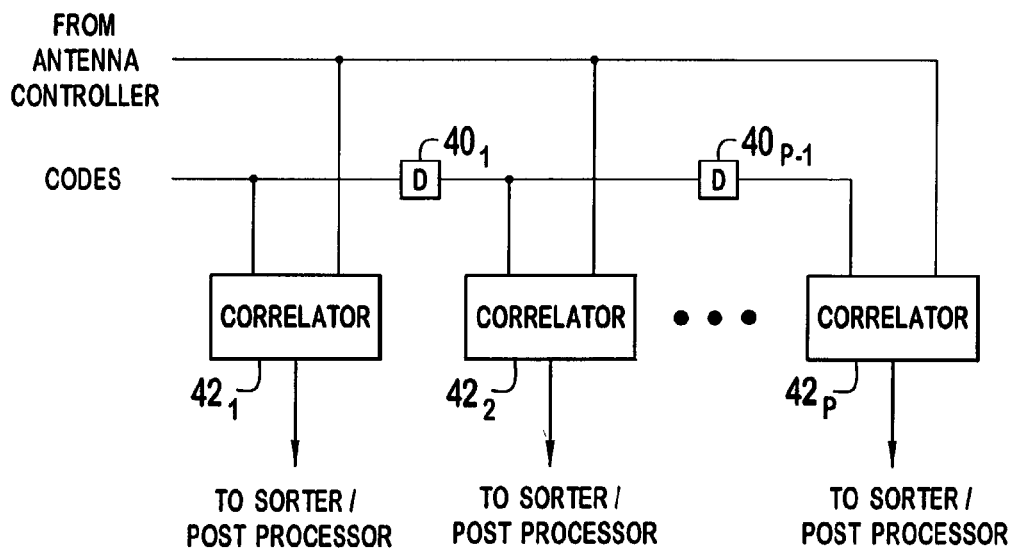
FIG. 3 is a simplified diagram of a correlator set.

FIG. 3 illustrates a correlator set 34. Each correlator set 34 has a fixed number, P, of correlators $42_1$ to $42_P$ (42). The correlators 42 may be any code correlation device, such as a matched filter. Preferably, the number of correlators 42 is sufficient to cover the expected delay spread from each user plus an additional margin for uncertainty, such as a 100 chip spread. However, the number of correlators 42 may be less than the delay spread with multiple correlator sets 42 being used to process one user's delay spread. Such an implementation would be desirable where the path searcher may be applied to systems experiencing differing delay spreads.

Input into each correlator 42 of the correlator set 34 is an output from the antenna controller 30. Effectively, each correlator set 34 at a specific time is coupled to one of the base station's/Node-B's antenna elements 28, via the antenna controller 30. Also, input into each correlator is a particular user's code. Each correlator 42 is reconfigurable to correlate any one of the users' codes. Between each correlator code input is a delay device $40_1$ to $40_{P-1}$ (40). As a result, each correlator 42 correlates the signal received by a particular antenna element 28 with a code phase delayed version of a particular user code.

Preferably, each delay device 40 delays the user code by a predetermined amount, such as by one chip. As a result, the set 34 of correlators 42 evenly spans the window of the delay spread. To illustrate, if 100 correlators 42 were assigned to a set 34 and each delay device 40 delayed the code by one chip, the correlator set 34 would span a window of 100 chips with a correlator sample being made at each chip delay. Each correlator output is input into a sorter/post processor 36.

The correlator sets 34 effectively forms a reconfigurable correlator pool. Each set is capable of processing any antenna output for any user code. The uniform reconfigurablity of each set 34 facilitiates implementing the correlators 42 using a small scalable design, which is highly advantageous for use on an application specific integrated circuit (ASIC). For ASICs having a clock rate exceeding the chip rate, each reconfigurable correlator set 34 can be used to process multiple antenna/code combinations. To illustrate for a 48x chip rate clock, each correlator set 34 can process 48 antenna/code combinations.

The output of each correlator 42 is processed by a sorter/post processor 38. The sorter/post processor 36 identifies paths for each user having a highest energy level. A path selector 38 produces a path profile for each user, UE 1 path profile to UE N path profile. The path profile for each user is used to recover that user's signal data, such as by applying code phases and weights to fingers of a Rake receiver. If a user is received over multiple antennas and/or sectors, a profile is either produced for each antenna/sector or a combined profile over all of the antennas/sectors is produced.

The preferred correlator sets 34 allows for flexibility in utilization of the Node-B/base station path searcher hardware. Due to the reconfigurability of the correlator sets, software can modify the hardware as cell conditions change. Typically, the path searcher hardware needs to be sufficient to prepare path profiles for an expected peak cell loading. In an inflexible implementation during non-peak periods, hardware is left idle. With the flexibility of the reconfigurable correlator sets 34, the potentially idle hardware can be applied to improve the service for the current users. To illustrate, a cell is experiencing a low user loading. The software reconfigures the hardware to more frequently update the path profile for the currently serviced users. As a result, the quality of the path profiles increases improving the reception quality for each user.

Additionally, the reconfigurability has other benefits. For users requiring a higher quality of service (QOS), path profiles can be updated at a more frequent period than users requiring a lesser QOS. As a result, the flexibility of the reconfigurable correlator sets 34 aids in the higher QOS users to meet their desired QOS.

Figure 4:
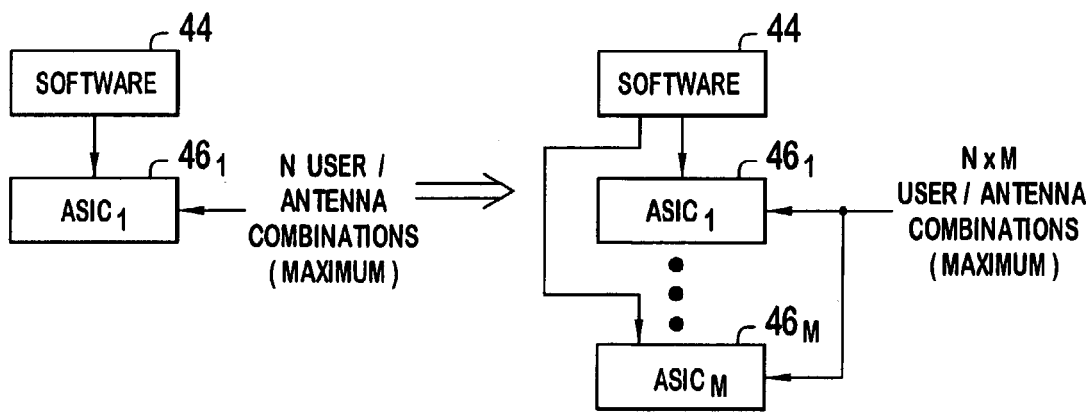
FIG. 4 is an illustration of scaling a pather searcher by adding ASICs.

FIG. 4 is an illustration of the scalability of the path searcher when implemented on an ASIC. Initially, a Node-B/base station services a maximum of N user/antenna combinations. The ASIC $46_1$ is capable of handling the N user/antenna combinations. The antenna controller 30 and code controller 32 are configured by software 44 as to the number of antennas and sectors of the cell as well as the user codes. As the cell loading grows, additional ASICs $46_2$ to $46_M$ are added. Since each correlator set 34 is configurable to any antenna/user code combination, the software 44 can distribute the antenna/user combinations over the ASICs $46_1$ to $46_M$.

Preferably, for a receiver having multiple ASICs $46_1$ to $46_M$, each user is assigned a specific ASIC by the software 44 to facilitate developing path profiles over multiple antenna elements 28 and sectors 27. Alternately, an ASIC $46_1$ to $46_M$ could be assigned to each sector or another assignment approach may be used.

Figure 5:
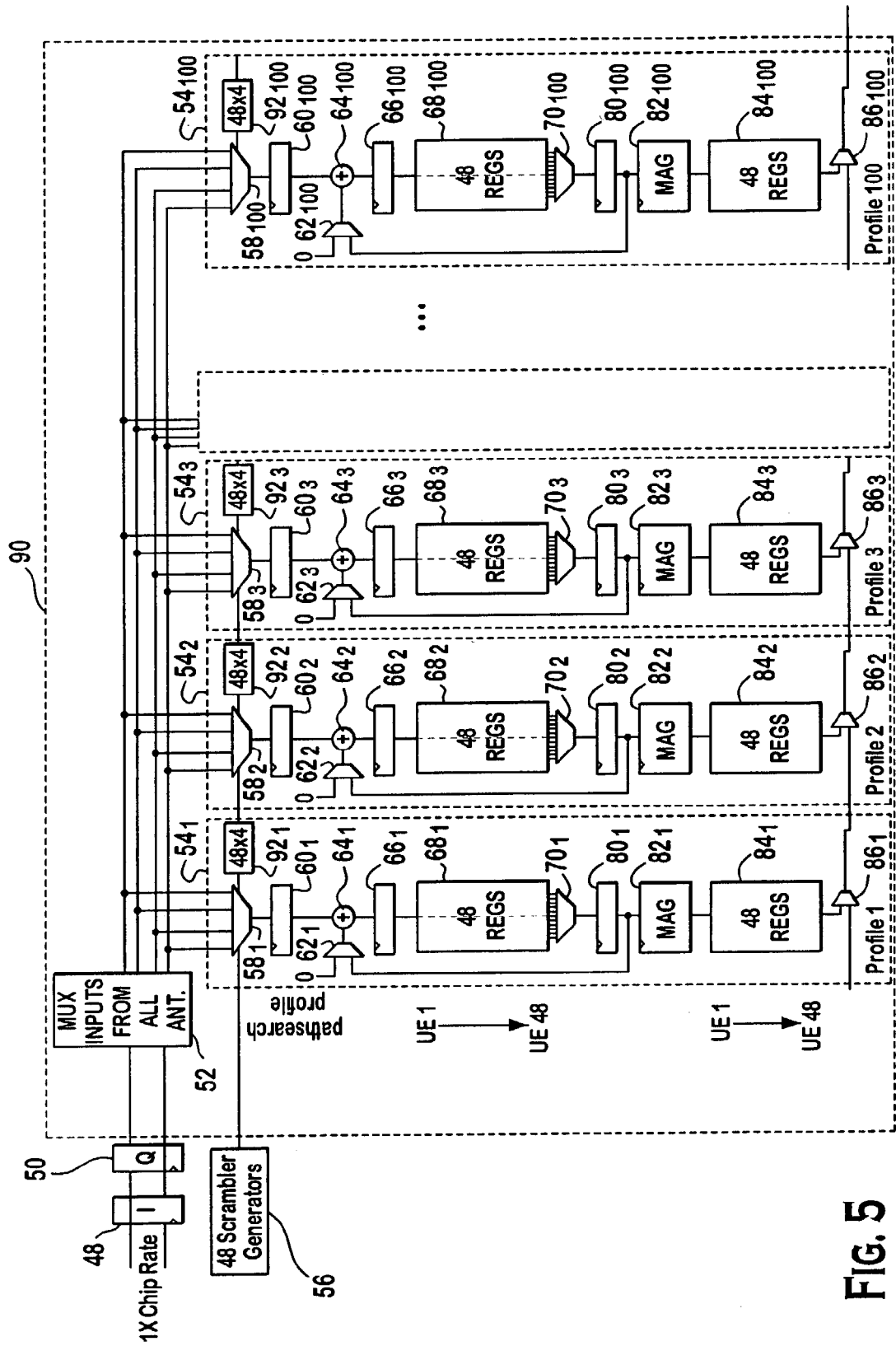
FIG. 5 is a diagram of a preferred 3 GPP correlator set.

FIG. 5 is a diagram of a preferred correlator set 68 for a 3 GPP path searcher. The corrlator set 90 receives an output from an antenna 28. In a 3 GPP system, the communications are sent using quadrature phase shift keying (QPSK) modulation. An in-phase sampling device 48 and a quadrature sampling device 50 produce in-phase (I) and quadrature (Q) samples of the selected antenna output. The samples are processed by a multiplexer 52 to produce complex results.

Preferably, 48 codes are produced by 48 scrambling code generators 56. In the preferred implementation, a 48 times chip rate clock is used. For a given chip period, the correlators $54_1$ to $54_{100}$ (54) sequentially correlate each of the 48 access codes during each clock period.

Each correlator 54 has a MUX $58_1$ to $58_{100}$ (58) for effectively mixing one of the access codes with complex samples. A buffer $60_1$ to $60_{100}$ (60) stores the mixed result. To produce the correlated result, a sum and dump circuit is used. For one of the 48 codes, the mixed result is stored in a buffer $66_1$ to $66_{100}$. The buffered result is stored in one of 48 registers $68_1$ to $68_{100}$. The registers allow the sum and dump circuit to accumulate values over multiple chips. A MUX $70_1$ to $70_{100}$ selects the accumulated results for one of the codes. A buffer $80_1$ to $80_{100}$ buffers the selected result. To accumulate the results over multiple chips, the prior accumulated result for a code is passed through a MUX $62_1$ to $62_{100}$ and an adder $64_1$ to $64_{100}$ adds the prior accumulated result to the next mixed sample.

After the specified number of chips, a magnitude device $82_1$ to $82_{100}$ determines the magnitude of the complex result. The magnitude for each of the 48 codes is stored in a respective register $84_1$ to $84_{100}$. A MUX $86_1$ to $86_{100}$ outputs the result for the respective code for each correlator $54_1$ to $54_{100}$.

Using the implementation of FIG. 5, one correlator set 90 is capable of handling 48 codes over a chip delay spreads of 100 chips. To extend the range of the Node-B, half of the produced codes can be 100 chip delayed versions of the other codes. As a result, the correlator bank 68 can process 24 codes over a delay of 200 chips in one chip period.

By adding correlators 54 to the correlator set 90, the chip range of the set 90 can be extended in alternate implementations. Also, by varying the produced codes and the clock rate, the number of processed codes can be changed.

What is claimed is:

1. A Node-B/base station having:
    at least one antenna for receiving signals from users; and
    a path searcher comprising:
        a set of reconfigurable correlators, each correlator for correlating an inputted user code with an inputted antenna output of the at least one antenna;
        an antenna controller for selectively coupling any output of the at least one antenna to an input of each correlator of the set of correlators;
        a code phase controller for selecting a user code for input into the set of correlators;
        a series of delays, each delay delaying the selected user code by a predetermined amount and each correlator of the set of correlators receiving a different code phase delay of the selected user code; and
        a sorter and path selector for sorting output energy levels of each correlator of the sets of correlators and producing a path profile for a user based on the sorted output energy levels.

2. The Node-B/base station of claim 1 wherein each delay of the series of delays delaying the selected user code by a one chip delay.

3. The Node-B/base station of claim 1 wherein the path searcher operating at a multiple of a chip rate of received user signals and the correlator set correlating a different user code and antenna combination for each multiple of the chip rate.

4. The Node-B/base station of claim 1 wherein the sorter and path selector produces a path profile for each user for each antenna that receives signals of that user.

5. The Node-B/base station of claim 1 wherein the sorter and path searcher produces a path profile for each user including paths of signals of that user received over multiple antennas.

6. The Node-B/base station of claim 5 wherein at least one of the path profiles includes paths from differing sectors of a cell.

7. The Node-B/base station of claim 1 wherein each correlator is a matched filter.

8. A scalable Node-B/base station comprising:
    at least one antenna for receiving signals from users;
    a path searcher comprising:
        at least one application specific integrated circuit (ASIC) having:
            at least one set of reconfigurable correlators, each correlator of each correlator set for correlating an inputted user code with an inputted antenna output of the at least one antenna;
            a code phase controller for selecting a user code for input into each set of correlators;
            an antenna controller for selectively coupling any output of the at least one antenna to an input of each correlator of each set of correlators;
            for each set of correlators, a series of delays, each delay delaying the selected user code by a predetermined amount and each correlator of the set of correlators receiving a different code phase delay of the selected user code; and
            a sorter and path selector for sorting output energy levels of each correlator of the sets of correlators and producing a path profile for a user based on the sorted output energy levels; and
        software for reconfiguring the code phase controller and the antenna controller as additional ASICs are added to the path searcher at the Node-B/base station.

9. The scalable Node-B/base station of claim 8 wherein the path searcher servicing a plurality of sectors and each user within a cell of the scalable Node-B/base station being assigned to a single ASIC.

10. A method for increasing capacity of a base station, the method comprising:
    providing a first application specific integrated circuit (ASIC) having at least one set of reconfigurable correlators, each correlator set configurable to process any of a plurality of user codes and any of a plurality of antenna outputs;
    as the base station loading increases, adding an additional ASIC having an additional set of correlators; and
    reconfiguring the first ASIC by software upon addition of the additional ASIC.

11. The method of claim 10 wherein the base station servicing a plurality of sectors and each user within a cell of the base station being assigned to a single ASIC of the first and additional ASICs.

12. A method for utilizing path searcher hardware for a Node-B/base station, the method comprising:
    providing hardware having at least one set of correlators, each set of correlators reconfigurable to process differing user codes, the hardware configured to process a peak user load;
    at peak periods, assigning the at least one set of correlators to prepare user path profiles at a desired update rate; and
    at non-peak periods, assigning the at least one set of correlators to prepare user path profiles at an update rate higher than the desired update rate so that all the at least one set of correlators is fully utilized.

13. The method of claim 12 wherein each set of correlators is reconfigurable to process differing antenna outputs.

14. A method for utilizing path searcher hardware for a Node-B/base station, the method comprising:
    providing hardware having at least one set of correlators, each set of correlators reconfigurable to process differing user codes, the hardware configured to process a peak user load;
    determining users requiring a higher quality of service; and for each user determined to require a higher quality of service, assigning the at least one set of correlators to prepare each higher quality of service user path profiles at an update rate higher than other users.

* * * * *

UNITED STATES PATENT AND TRADEMARK OFFICE
CERTIFICATE OF CORRECTION

PATENT NO.         : 7,082,286 B2
APPLICATION NO.    : 10/412475
DATED              : July 25, 2006
INVENTOR(S)        : Kaewell, Jr. et al.

It is certified that error appears in the above-identified patent and that said Letters Patent is hereby corrected as shown below:

Title page item (56), U.S. PATENT DOCUMENTS, page 2, left column, line 11, delete "6,414,984 B1 * 7/2002 St.and.hle ... 375/142" and insert therefor --6,414,984 B1 * 7/2002 Stähle ... 375/142--.

Item (56), U.S. PATENT DOCUMENTS, page 2, right column, line 3, delete "2002/0010002 A1  1/2002 Heinla" and insert therefor --2002/0010002 A1  1/2002 Heinila --.

Item (56), page 2, FOREIGN PATENT DOCUMENTS, right column , before line 1, insert --CN 1140365 1/1997--.

At column 1, line 19, after the word "IN", insert --a--

At column 2, line 49, before the word "searcher", delete "pather" and insert therefor --path--.

At column 4, line 66, after the word "delay", delete "spreads" and insert therefor --spread--.

Signed and Sealed this

Seventeenth Day of April, 2007

JON W. DUDAS
*Director of the United States Patent and Trademark Office*